(12) United States Patent
Rached et al.

(10) Patent No.: US 8,557,135 B2
(45) Date of Patent: Oct. 15, 2013

(54) AZEOTROPE AND AZEOTROPE-LIKE COMPOSITION OF 2,3,3,3-TETRAFLUOROPROPENE AND AMMONIA

(75) Inventors: Wissam Rached, Chaponost (FR); Jean-Christophe Boutier, Oullins (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/178,955

(22) Filed: Jul. 8, 2011

(65) Prior Publication Data

US 2012/0205574 A1  Aug. 16, 2012

(30) Foreign Application Priority Data

Feb. 10, 2011 (FR) ..................... 11.51077

(51) Int. Cl.
*C09K 5/04* (2006.01)
(52) U.S. Cl.
USPC ............................................. 252/67
(58) Field of Classification Search
USPC ............................................. 252/67, 68
See application file for complete search history.

(56) References Cited

U.S. PATENT DOCUMENTS

2006/0243945 A1* 11/2006 Minor et al. ..................... 252/67

* cited by examiner

*Primary Examiner* — John Hardee
(74) *Attorney, Agent, or Firm* — Buchanan Ingersoll & Rooney P.C.

(57) ABSTRACT

The present invention relates to azeotrope and azeotrope-like compositions comprised of 2,3,3,3-tetrafluoropropene (HFO-1234yf) and ammonia, and uses thereof.

8 Claims, 1 Drawing Sheet

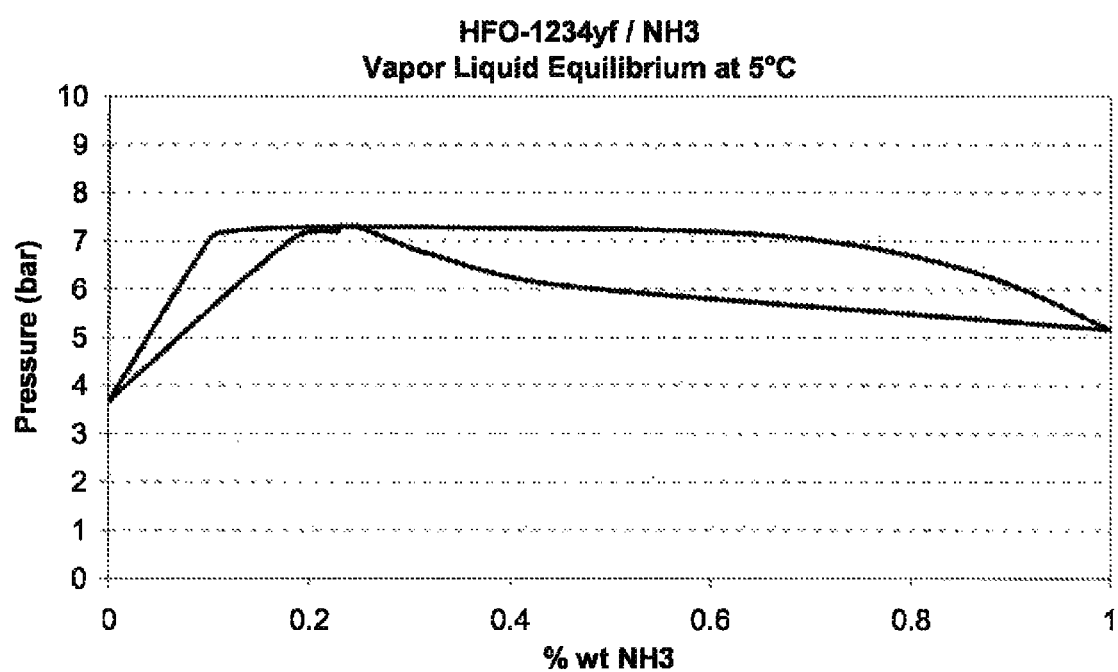

AZEOTROPE AND AZEOTROPE-LIKE COMPOSITION OF 2,3,3,3-TETRAFLUOROPROPENE AND AMMONIA

FIELD OF INVENTION

The present invention relates to azeotrope and azeotrope-like compositions comprised of 2,3,3,3-tetrafluoropropene (HFO-1234yf) and ammonia, and uses thereof.

BACKGROUND

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, including the relatively high global warning potentials associated therewith, it is desirable to use fluids having low or even zero ozone depletion potential and very low global warming potential. Additionally, the use of single component fluids or azeotropic mixtures, which do not fractionate on boiling and evaporation, is desirable. However, the identification of new, environmentally safe, non-fractionating mixtures is complicated due to the fact that azeotrope formation is not readily predictable.

The object of the present invention is to provide novel compositions that can serve as refrigerants, heat transfer fluids, cleaning agents, propellants, blowing agents, solvents, etc. that provide unique characteristics to meet the demands of low or zero ozone depletion potential and lower global warming potential as compared to the current HFCs.

BRIEF DESCRIPTION OF THE DRAWINGS

FIG. 1 is a graph of Pressure versus weight % NH3

DESCRIPTION OF PREFERRED EMBODIMENTS

The present invention provides azeotrope or azeotrope-like compositions comprised of 2,3,3,3-trifluoropropene (HFO-1234yf) and ammonia ($NH_3$).

The preferred compositions of the invention have low-flammability and very low global warming potentials ("GWPs"). Accordingly, applicants have recognized that such compositions can be used to great advantage in a number of applications, including as replacements for CFCs, HCFCs, and HFCs (such as HCFC-22, HFC-134a, HFC-32) as refrigerants, heat transfer fluids, cleaning agents, propellants, blowing agents, solvents, and in other applications.

Additionally, applicants have recognized surprisingly that azeotrope or azeotrope-like compositions of HFO-1234yf and ammonia can be formed. Accordingly, in other embodiments, the present invention provides methods of producing an azeotrope-like composition comprising combining HFO-1234yf and ammonia in amounts effective to produce an azeotrope-like composition.

Azeotrope-Like Compositions

As used herein, the term "azeotrope-like" is intended in its broad sense to include both compositions that are strictly azeotropic, are compositions that behave like azeotropic mixtures, and are quasi-azeotropic.

As used herein, the term "quasi-azeotrope" is intended to include the compositions for which, at constant temperature, the pressure of the saturated liquid and the pressure of the saturated vapor are almost identical, with the difference in pressure being 10% or less, preferably 5% or less, compared to the liquid saturated vapor pressure.

For azeotropic compositions, at constant temperature, the maximum difference in pressure is close to 0%.

It follows that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

Applicants have discovered unexpectedly that HFO-1234yf and ammonia form azeotrope and/or azeotrope-like compositions.

By binary compositions of the present invention, one understands as compositions consisting of HFO-1234yf and ammonia; that is to say a composition consisting primarily of HFO-1234yf and ammonia, but being able to contain impurities at less than 1%, preferably less than 0.5%, more preferably less than 0.1%, more preferably less than 0.05% and even more preferably less than 0.01%.

According to certain preferred embodiments, the azeotrope or azeotrope-like compositions of the present invention comprise, and preferably consist essentially of, effective azeotrope or azeotrope-like amounts of HFO-1234yf and ammonia. The term "effective azeotrope-like amounts" as used herein refers to the amount of each component that upon combination with the other components, results in the formation of an azeotrope-like composition of the present invention. Preferably, the present azeotrope-like compositions comprise, and preferably consist essentially of, from 1 to 60 wt % ammonia and from 40 to 99 wt % HFO-1234yf, more preferably from 5 to 45 wt % ammonia and from 55 to 95 wt % HFO-1234yf, more preferably from 15 to 30 wt % ammonia and from 70 to 85 wt % HFO-1234yf, more preferably from 18 to 26 wt % ammonia and from 74 to 82 wt % HFO-1234yf, and even more preferably from 21 to 23 wt % ammonia and from 77 to 79 wt % HFO-1234yf.

Among the compositions above, some have the advantage of being azeotropic or quasi-azeotropic. For example, an azeotrope for the binary mixture of HFO-1234yf/$NH_3$ is obtained for a proportion of $NH_3$ at approximately 23% (±2%), at a temperature of 5° C. (±1° C.) and with a pressure of 7.3 bar (±1 bar).

The azeotrope-like compositions of the present invention can be produced by combining effective azeotrope or azeotrope-like amounts of HFO-1234yf and ammonia. Any of a wide variety of methods known in the art for combining two or more components to form a composition can be adapted for use in the present methods to produce an azeotrope-like composition. For example, HFO-1234yf and ammonia can be mixed, blended, or otherwise contacted by hand and/or by machine, as part of a batch or continuous reaction and/or process, or via combinations of two or more such steps. In light of the disclosure herein, those of skill in the art will be readily able to prepare azeotrope-like compositions according to the present invention without undue experimentation.

The azeotrope or azeotrope-like compositions of the present invention may further include any of a variety of optional additives including surface active agents, stabilizers, tracers, fluorescent agents, odorants, solubilizing agents, and the like.

In certain preferred embodiments, the compositions of the present invention further comprise a lubricant. Examples of suitable lubricants include mineral oil, alkyl benzenes, polyol esters, polyalkylene glycols, polyvinyl ethers, polyalpha olefins, and the like.

The present compositions have utility in a wide range of applications including as refrigerants, heat transfer fluids, cleaning agents, propellants, blowing agents, solvents, and in other applications. For example, one embodiment of the present invention relates to refrigerant compositions comprising the present azeotrope-like compositions.

EXAMPLES

The invention is further illustrated in the following examples which are intended to be illustrative, but not limiting in any manner.

Example 1

Vapor-Liquid Equilibrium

Vapor-liquid equilibrium experiments were conducted on binary mixtures of HFO-1234yf and ammonia using the following procedure: A vacuum cell is equipped with a sapphire tube and is cooled to 5° C. with an oil bath. Once thermal equilibrium is reached the cell is charged with HFO-1234yf and the equilibrium pressure is recorded. A quantity of ammonia is added to the cell and the contents are mixed. At equilibrium, a minimal quantity of sample is taken from the gas and liquid phases for an analysis by gas chromatography with a thermal conductivity detector.

The data obtained at various mixtures of HFO-1234yf and ammonia is shown in FIG. 1. Table 1 gives the composition of the liquid and the corresponding pressure at equilibrium.

TABLE 1

| Liquid composition and Pressure | | |
| --- | --- | --- |
| 1234yf (wt %) | NH3 (wt %) | Pressure (bar) |
| 100 | 0 | 3.69 |
| 90 | 10 | 7.02 |
| 80 | 20 | 7.29 |
| 70 | 30 | 7.29 |
| 60 | 40 | 7.27 |
| 50 | 50 | 7.25 |

TABLE 1-continued

| Liquid composition and Pressure | | |
| --- | --- | --- |
| 1234yf (wt %) | NH3 (wt %) | Pressure (bar) |
| 40 | 60 | 7.19 |
| 30 | 70 | 7.03 |
| 20 | 80 | 6.69 |
| 10 | 90 | 6.09 |
| 0 | 100 | 5.16 |

What is claimed is:

1. An azeotrope-like composition consisting of:
   from 20 to 60 wt % ammonia;
   from 40 to 80 wt % HFO1234yf;
   optionally, an additive selected from the group consisting of surface active agents, stabilizers, tracers, fluorescent agents, odorants, and solubilizing agents; and
   optionally, a lubricant,
   wherein the composition, at constant temperature of 5° C., exhibits a pressure of the saturated liquid and a pressure of the saturated vapor which differ by 10% or less.

2. The azeotrope-like composition of claim 1 consisting of from 20 to 40 wt % ammonia and from 60 to 80 wt % HFO-1234yf.

3. The azeotrope-like composition of claim 1 consisting of from 20 to 60 wt % ammonia and from 40 to 80 wt % HFO-1234yf.

4. The azeotrope-like composition of claim 1 consisting of:
   from 20 to 40 wt % ammonia;
   from 60 to 80 wt % HFO-1234yf;
   optionally, an additive selected from the group consisting of surface active agents, stabilizers, tracers, fluorescent agents, odorants, and solubilizing agents; and
   optionally, a lubricant.

5. An azeotrope-like composition consisting essentially of:
   from 20 to 60 wt % ammonia; and
   from 40 to 80 wt % HFO1234yf,
   wherein the composition, at constant temperature of 5° C., exhibits a pressure of the saturated liquid and a pressure of the saturated vapor which differ by 10% or less.

6. The composition of claim 5, the composition further including an additive selected from the group consisting of surface active agents, stabilizers, tracers, fluorescent agents, odorants, and solubilizing agents.

7. The composition of claim 5, the composition further including a lubricant.

8. The composition of claim 5, the composition further including an additive selected from the group consisting of surface active agents, stabilizers, tracers, fluorescent agents, odorants, and solubilizing agents, and further including a lubricant.

* * * * *